US007680987B1

(12) United States Patent
Clark et al.

(10) Patent No.: US 7,680,987 B1
(45) Date of Patent: Mar. 16, 2010

(54) SUB-PAGE-GRANULAR CACHE COHERENCY USING SHARED VIRTUAL MEMORY MECHANISM

(75) Inventors: Roy Clark, Hopkinton, MA (US); David W. DesRoches, Methuen, MA (US)

(73) Assignee: EMC Corporation, Hopkinton, MA (US)

( * ) Notice: Subject to any disclaimer, the term of this patent is extended or adjusted under 35 U.S.C. 154(b) by 1022 days.

(21) Appl. No.: 11/393,174

(22) Filed: Mar. 29, 2006

(51) Int. Cl.
G06F 13/00 (2006.01)
G06F 12/08 (2006.01)
(52) U.S. Cl. .................. 711/147; 711/155; 711/207
(58) Field of Classification Search ............. 711/147, 711/207, 155
See application file for complete search history.

(56) References Cited

U.S. PATENT DOCUMENTS

| 6,081,833 A * | 6/2000 | Okamoto et al. ............ 709/213 |
| 6,247,144 B1 * | 6/2001 | Macias-Garza et al. ....... 714/25 |
| 6,681,239 B1 * | 1/2004 | Munroe et al. .............. 718/104 |
| 7,249,224 B2 * | 7/2007 | Glasco ...................... 711/141 |
| 2002/0013889 A1 | 1/2002 | Schuster et al. |
| 2003/0167420 A1 * | 9/2003 | Parsons ....................... 714/10 |
| 2006/0236063 A1 * | 10/2006 | Hausauer et al. ............ 711/170 |
| 2007/0260821 A1 | 11/2007 | Zeffer et al. |

OTHER PUBLICATIONS

Clark, Roy, et al., U.S. Appl. No. 11/393,063, filed Mar. 29, 2006, entitled "Implicit Locks in a Shared Virtual Memory System".
Clark, Roy, et al., U.S. Appl. No. 11/393,438, filed Mar. 29, 2006, entitled "Techniques for Mirroring Data Within a Shared Virtual Memory System".

* cited by examiner

*Primary Examiner*—Shane M Thomas
(74) *Attorney, Agent, or Firm*—BainwoodHuang (57) ABSTRACT

A technique involves providing access to shared data based on enhanced standard virtual memory mechanisms. Once data from a shared area of memory is moved into primary memory of a first computerized device from a second computerized device, the first computerized device can retain that data in order to shorten the latency of subsequent accesses. Such a technique can be configured to handle shared data at the sub-page-granular level using sparse virtual pages to minimize memory access contention and thus improve the likelihood of quick re-hits. Furthermore, such a technique can be conveniently accomplished through an enhancement to a common page fault handler of an operating system and utilizing atomic remote access support from a standard communications protocol thus alleviating the need to employ more costly and complicated solutions such as inflexible hardware implementations or independent programs that could pose additional design burdens and reliability concerns.

24 Claims, 8 Drawing Sheets

SUB-PAGE-GRANULAR CACHE COHERENCY USING SHARED VIRTUAL MEMORY MECHANISM

BACKGROUND

A shared memory system typically includes multiple processing nodes connected together by a communications medium (e.g., a bus, a network, etc.). Each processing node includes a processor and local memory. In general, a processor can access its local memory faster than non-local memory (i.e., the local memory of another processor). SMP (symmetric multiprocessing), ccNUMA (cache-coherent non-uniform memory access) and NUMA (non cache-coherent non-uniform memory access) are examples of conventional multiprocessor architectures which employ shared-memory schemes.

One conventional NUMA shared memory system uses a page-granular data-sharing approach which involves the nodes exchanging and modifying shared pages of data at the page-granular level. For example, suppose that the processor of a first node of the system wishes to modify data on a particular shared page residing in the local memory of a second node. To modify the page, the processor of the first node sends a message requesting the page to the second node through the communications medium of the system. The processor of the second node responds to the message by locking the page and sending the page to the first node through the communications medium. The processor of the first node then modifies the page and sends the modified page back to the second node through the communications medium. Upon receipt of the modified page, the processor of the second node releases the lock so that the page is available again.

It should be understood that, while the page is locked on behalf of the first node, other nodes of the system are unable to modify the page. If another node wishes to modify the same page, that other node must wait until the lock on the page is released (e.g., until the first node completes its modification of the page, returns the page to the second node, and relinquishes the lock) before that other node can have a turn at locking and modifying the page.

One conventional ccNUMA shared memory system uses a cache-line-granular data-sharing approach which involves the nodes exchanging and modifying shared cache lines of data at the cache-line-granular level. For example, suppose that the processor of a first node of the system wishes to modify data on a particular shared cache line residing in the local memory of a second node. To modify the cache line, hardware logic within the first node sends a message requesting the cache line to the second node through the communications medium of the system. The hardware logic within the second node responds to the message, sending the cache line to the first node through the communications medium. The hardware logic on all nodes maintains the cache coherency of all shared cache lines.

SUMMARY

Unfortunately, there are deficiencies to the above-described conventional page-granular data-sharing and cache-line-granular data-sharing approaches. For example, the above-described page-granular conventional system requires the transfer of a page of data back-and-forth between nodes during each modification operation. That is, each time a node wishes to perform a modification operation on a shared page in non-local memory, that node must retrieve the page through the communications medium, modify the page and return the modified page through the communications medium, thus consuming a large amount of system resources coordinating the back-and-forth transfers. Such a back-and-forth transfer occurs through the communications medium during each access even if there is only one node accessing a particular page remotely.

Additionally, with the conventional page-granular data-sharing approach, there may be unnecessary contention between nodes for the same page if the amount of data accessed by the nodes is substantially small relative to the page-granularity of the shared data. For instance, if a first node wishes to modify only a small portion of data in the top half of a page and a second node wishes to modify only a small portion of unrelated data in the bottom half of that same page, the first and second nodes must still contend for access to that page. Contention between the nodes would increase further if other nodes required access to separately partitioned data on the same page since only one of the nodes can have access to the shared page at any one time while all other nodes must wait.

Furthermore, implementation of the conventional page-granular data-sharing approach typically is in software above the core operating system level, thus imposing the additional burden of designing and implementing a sharing scheme that must address the complexities of remote memory access and locking.

The conventional ccNUMA cache-line-granular data-sharing approach eliminates the contention problem related to partitions within a page described above because the unit of sharing is much finer grained. However, the issue with the conventional ccNUMA is that the hardware logic on each node creates a single shared memory region. This singularity creates a large fault domain and reduces overall system reliability.

In contrast to the above-described conventional page-granular data-sharing and cache-line-granular sharing approaches, an improved technique provides access to finer than page-grained shared data without creating a single fault domain, by leveraging and extending standard virtual memory mechanisms. In particular, once data from a remote shared area of memory is moved into primary memory of a first computerized device from a second computerized device (e.g., in a manner similar to faulting a page into primary memory from magnetic disk memory), the first computerized device can retain that data in order to shorten the latency of subsequent accesses (i.e., to experience quick re-hits). Along these lines, such a technique can be configured to handle shared data at the sub-page-granular level using sparse virtual pages to minimize memory access contention and thus improve the likelihood of quick re-hits. Furthermore, such a technique can be conveniently accomplished through an enhancement to a common page fault handler of an operating system and using atomic remote access support from a standard communications protocol (e.g., InfiniBand, Rapid IO, etc.), thus alleviating the need to employ more costly and complicated solutions such as inflexible hardware implementations or independent programs that could pose additional design burdens and reliability concerns.

One embodiment is directed to a method for accessing data which is performed in a computerized device having physical memory and a page table which maps a local virtual memory range and a shared virtual memory range to the physical memory. The method includes receiving a request for data and determining whether a page fault (or page hit) has occurred based on an examination of virtual memory metadata. The method further includes providing, in response to a determined page hit where the data resides in the physical memory, access to the data residing in the physical memory. The method further includes moving, in response to a determined page fault where the data does not reside in the physical memory, the data (i) from secondary memory (e.g., magnetic disk drives) into the physical memory when the virtual address of the request falls within the local virtual memory range and (ii) from another computerized device (e.g., atomic remote direct memory access) into the physical memory when the virtual address of the request falls within the shared virtual memory range. As a result, the computerized device can enjoy relatively short-latency subsequent accesses of the shared virtual memory range data (i.e., quick re-hits) if the data remains available on the computerized device. That is, the computerized device can enjoy local memory performance on subsequent shared memory accesses.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

An improved technique involves providing access to shared data based on enhanced standard virtual memory mechanisms. In particular, once data from a shared area of memory is moved into primary memory of a first computerized device from a second computerized device (e.g., in a manner similar to faulting a page into primary memory from magnetic disk memory), the first computerized device can retain that data in order to shorten the latency of subsequent accesses (i.e., to experience quick re-hits). Along these lines, such a technique can be configured to handle shared data at the sub-page-granular level using sparse virtual pages to minimize memory access contention and thus improve the likelihood of quick re-hits. Furthermore, such a technique can be conveniently accomplished through an enhancement to a common page fault handler of an operating system and utilizing atomic remote access support from a standard communications protocol (e.g., InfiniBand, Rapid IO, etc.) thus alleviating the need to employ more costly and complicated solutions such as inflexible hardware implementations or independent programs that could pose additional design burdens and reliability concerns.

Figure 1:
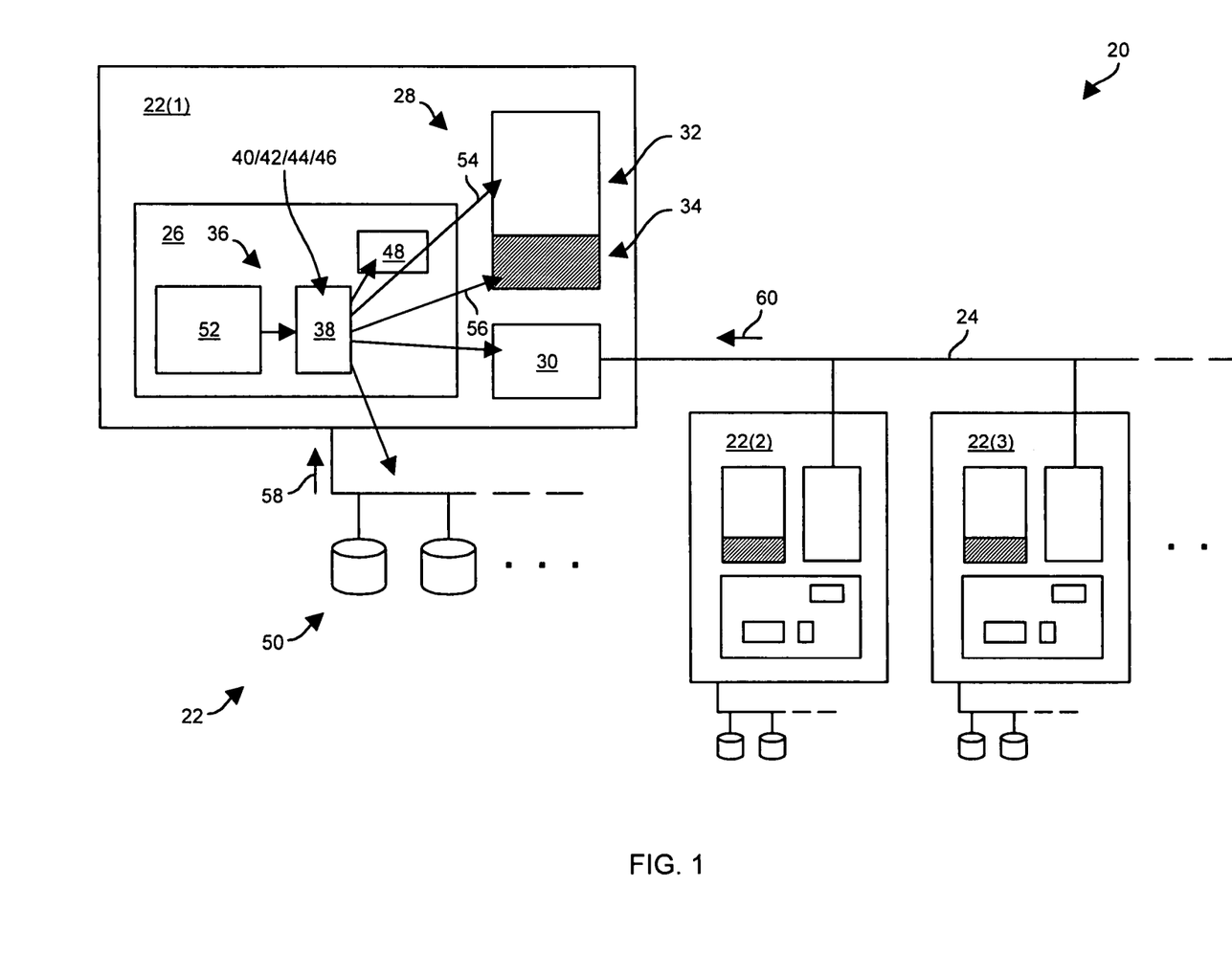
FIG. 1 is a block diagram of a shared-memory system which is configured to provide access to shared data based on enhanced standard virtual memory mechanisms.

FIG. 1 shows a shared memory system 20 which is configured to provide access to shared data based on enhanced standard virtual memory mechanisms. The shared memory system 20 includes multiple computerized devices 22(1), 22(2), 22(3), ... (collectively, computerized devices 22), and a communications medium 24 which connects the computerized devices 22 to each other as nodes of the system 20. The computerized device 22(1) is shown larger than the other computerized devices 22 in order to better illustrate particular details of each computerized device 22.

As shown best by the computerized device 22(1) in FIG. 1, each computerized device 22 has a controller 26, physical memory 28 (i.e., electronic semiconductor memory) and an interface to an internodal communication medium 30 (e.g., a host channel adapter or HCA). The physical memory 28 of each computerized device 22 is partitioned into an ordinary portion 32 and a specialized shared portion 34 (shaded). This specialized shared portion 34 is located at the same address and is of the same size on each computerized device 22 in the system 20. Furthermore, the physical memory 28 of the computerized device 22(1) is considered "local" (i.e., local memory) to the computerized device 22(1) but "remote" (i.e., remote memory) to the other computerized devices 22(2), 22(3), ... of the system 20. Similarly, the physical memory of the computerized device 22(2) is considered local to the computerized device 22(2) but remote to the other computerized devices 22(1), 22(3), ..., and so on.

As further shown by the computerized device 22(1) in FIG. 1, the controller 26 of each computerized device 22 includes processing circuitry 36 (e.g., a CPU, a microprocessor, a processor chipset, etc.) which is configured for virtual memory (VM) addressing in both the traditional sense as well as an improved manner. Along these lines, the processing circuitry 36 employs a set of VM-related components 38 including a TLB 40, a page table 42 having page table entries 44 (PTEs), a page fault handler 46, etc. to provide VM-to-physical address mapping and translation. Accordingly, there is processor-supplied coherency between caches 48 (e.g., an L1 and an L2 cache) and the entire range of the physical memory 28. For simplicity, the TLB 40, the page table 42 having the PTEs 44, and the page fault handler 46 are shown generally by the reference numerals 40, 42, 44, and 46, respectively, in FIG. 1. Also for simplicity, the VM process, this allows for execution of applications 52 whose range of memory accesses exceed the size of the internal cache 48 and the available physical memory 28, is illustrated by the arrows leading toward and away from the set of VM-related components 38 in FIG. 1.

It should be understood that the page fault handler 46 of each device 22 includes enhancements that enable robust and reliable mapping and translation of not only a local virtual memory address range 54 (illustrated by the arrow 54 in FIG. 1), but also a shared virtual memory address range 56 (illustrated by the arrow 56 in FIG. 1) to the physical memory 28. In particular, in the event of a page fault on the local VM range 54, the page fault handler 46 coordinates transfer of data 58 into the ordinary portion 32 of local physical memory 28 from the magnetic disk drives 50 in a conventional manner. However, in the event of a page fault on the shared VM range 56, the page fault handler 46 coordinates transfer of shared data 60 into the specialized shared portion 34 of local physical memory 28 from another computerized device 22 (e.g., transfer into the physical memory 28 of the device 22(1) from the device 22(2)). Since the enhancements to the page fault handler 46 are software-based, the page fault handler 46 is more flexible than a rigid hardware implementation (i.e., the handler 46 is easily upgradeable).

It should be further understood that communications between the devices 22 during the transfer of shared data through the communications medium 24 preferably utilizes built-in support for masked atomic compare-and-swap (MACS) and remote direct memory access (RDMA) operations provided by a standard communications protocol. Such leveraging of off-the-shelf functionality for this enhanced operation alleviates the need to independently design and implement these features. InfiniBand and Rapid IO are examples of two communications protocols which are well-suited for providing MACS and RDMA support. Further details will now be provided with reference to FIG. 2.

Figure 2:
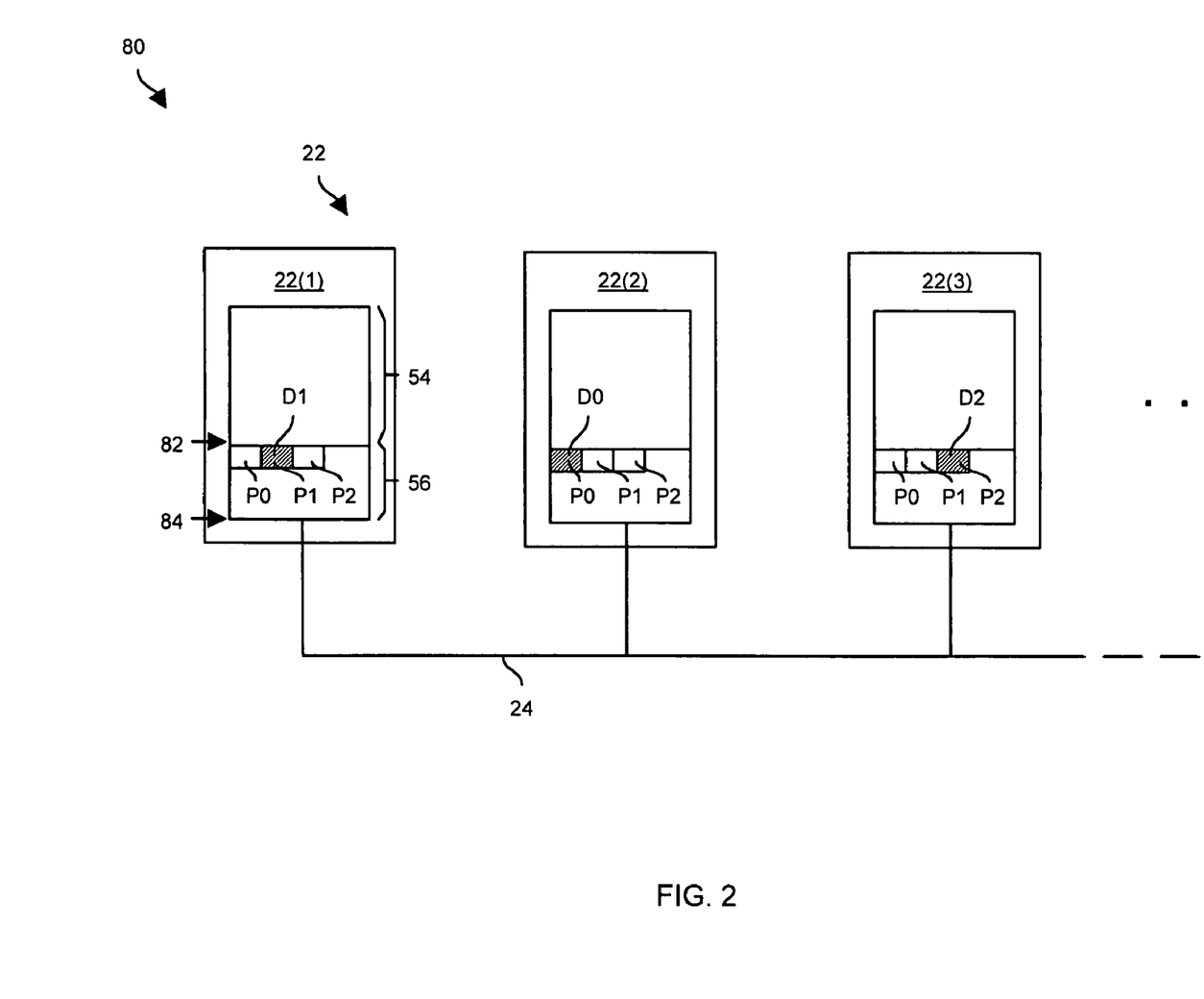
FIG. 2 is a block diagram of a distributed shared memory address layout for the system of FIG. 1.

FIG. 2 is a block diagram of a distributed shared virtual memory address (DSM) layout 80 for the shared memory system 20. Recall that the local VM range 54 maps virtual addresses to the internal cache 48 and the ordinary portion 32 of physical memory 28, and the shared VM range 56 maps virtual addresses to the internal cache 48 and the specialized shared portion 34 of physical memory 28 (also see FIG. 1). Although these virtual memory ranges 54, 56 are not necessarily shown in proper proportion to each other in FIG. 2 or in proportion to physical memory 28 in FIG. 1 (i.e., the shared virtual address range 56 can be much smaller than the local virtual address range 54 and virtual memory ranges 54, 56 can be much larger than physical memory 28), the starting address 82 and ending address 84 forming the shared VM range 56 are the same (i.e., the virtual addresses 82, 84 are replicated) on each computerized device 22 as shown in FIG. 2. Accordingly, the physically addressed pages P0, P1, P2, . . . of the specialized shared portion 34 of physical memory 28 (collectively, shared pages P) have the same physical addresses on each device 22, and the DSM layout 80 operates as an N-way mirror (N being the number of devices 22 in the system 20).

However, the actual shared data D0, D1, D2, . . . (i.e., the contents of the shared pages P) is not necessarily replicated on each computerized device 22. Rather, the actual shared data simply resides on the device 22 that last accessed it. By way of example, the device 22(1) is shown as having actual data D1 (shaded) because device 22(1) is the last device to access the data D1. Similarly, the device 22(2) is shown as having actual data D0 (shaded) because device 22(2) is the last device to access the data D0. Additionally, the device 22(3) is shown as having actual data D2 (shaded) because device 22(3) is the last device to access the data D2, and so on. Further details will now be provided with reference to FIG. 3.

Figure 3:
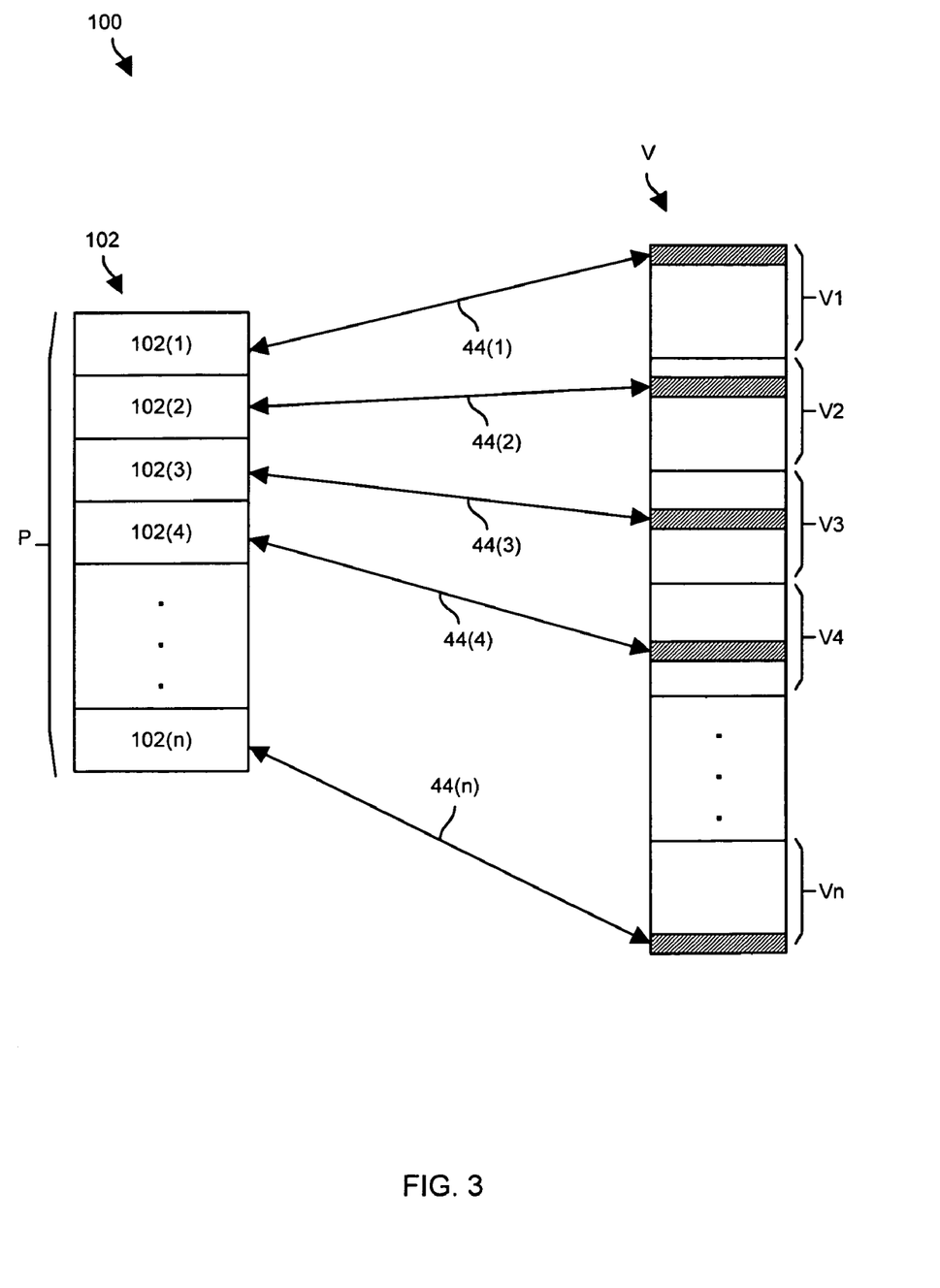
FIG. 3 is a block diagram of an address mapping scheme employed by the system of FIG. 1.

FIG. 3 is a block diagram 100 of a virtual to physical address mapping scheme employed by the system 20. As shown in FIG. 3, each physical page P of the specialized shared portion 34 of physical memory 28 is divided into a series of contiguous equal-sized physical "extents" (or sections of memory) 102. The size of an extent 102 is established based on the particular application and the size of the CPU's cache line, and establishes the granularity of the shared data. By way of example, if the application requires sharing 120 byte chunks of data (see the application 52 running on the controller 26 in FIG. 1), 128 bytes is a well-suited size for the coherence granule because 128 bytes is both (i) large enough to hold 120 bytes and (ii) a multiple of the cache line size of the controller 26. N extents 102 are shown as belonging to the physical page P in FIG. 3.

As shown in FIG. 3, the extents 102(1), 102(2), 102(3), 102(4), . . . , 102(n) of the specialized shared portion 34 of physical memory 28 map to sparse virtual pages V1, V2, V3, V4, . . . , Vn (collectively, virtual pages V) via page table entries 44(1), 44(2), 44(3), 44(4), . . . 44(n) (collectively, PTEs 44), respectively. In particular, the extents 102 coexist on the same physical page P in the physical memory 28 of each device 22. However, each extent 102 maps in a 1-to-1 manner to a separate virtual page V, and maintains its predefined offset (i.e., address offset from the beginning of the virtual page) on both the physical page P and the corresponding virtual page V.

Moreover, each sparse virtual page Vp has a designated "home" device 22 which maintains the ownership metadata for Vp and which remains static during operation of the system 20, as well as a current "owner" device 22 which is dynamic during operation of the system 20. In particular, at an initial configuration time which is prior to operation of the system 20, configuration software logic can predefine the computerized device 22(1) as the home of the sparse virtual page V1 (and thus the extent 102(1)). Similarly, the configuration software logic can predefine the computerized device 22(2) as the home of the sparse virtual page V2 (and thus the extent 102(2)), and so on. Once the system 20 is in operation, the device 22 that is currently accessing a sparse virtual page Vp or that accessed the sparse virtual page Vp most recently, is deemed the current owner of that virtual page Vp. Since the originally predefined homes of the sparse virtual pages Vp do not change while the system 20 is in operation, the current owner of each sparse virtual page Vp may be different than the home of that virtual page Vp.

It should be understood that the above-described mapping of each virtual page Vp to a single extent 102 enables simple utilization of the same traditional VM mechanism (i.e., the page table 42, the page fault handler 48, etc.) as that used for maintaining coherence of the ordinary portion 32 of physical memory 28 (also see FIG. 1). That is, the extents 102 leverage the VM page-centric support of the VM-related components 38 within the controller 26 (i.e., the PTEs 44, the TLB 40, etc.). The double-arrowed reference lines in FIG. 3 illustrate the 1-to-1 mapping relationship between the extents 102 and the sparse virtual pages Vp provided by particular PTEs 44 which, as mentioned earlier, statically provide such mapping throughout operation of the devices 22. Along these lines, on each device 22, the valid bit (V) of each PTE 44 corresponding to an extent 102 indicates whether that device 22 both currently owns the corresponding extent 102, and, has it locked for exclusive access. While this valid bit (V) is set, no other device 22 can access or become the current owner of the extent 102. Once the device 22 completes its accesses to extent 102, it resets this valid bit (V). Any subsequent access by this device 22 to the extent 102 will generate a page fault, and the page fault handler on the device 22 will need to determine if this device 22 is, or is not, the current owner by examining the PTE 44 contents. If the contents refer to this device 22, then this device is still the current owner and the page fault handler may set the PTE's 44 valid bit (V). Otherwise, this device 22 can send a request to the home node of the extent 102 to find out which device 22 currently owns the extent 102. To this end, on the home node, a field in the PTE 44 for the extent 102 contains metadata identifying which device 22 is the current owner of the extent 102. Accordingly, and as will be described in further detail below, the system 20 is well-equipped to respond to a single page-fault on the shared address range 56 by bringing shared data for an extent 102 into local physical memory 28 from remote physical memory 28 in a manner similar to faulting in a page from secondary memory. Further details will now be provided with reference to FIGS. 4-7.

FIGS. 4-7 show various phases of a shared memory access operation performed by an example configuration 200 for the system 20 when shared data must be faulted into a device 22 remotely from another device 22 through the communications medium 24. As shown in each of FIGS. 4-7 and for illustration purposes, there are three nodes in the system 20: computerized devices 22(A), 22(B) and 22(C). The shared virtual memory mechanisms within each device 22 (i.e., the VM-related components 38, also see FIG. 1) reliably coordinate access to shared data as will now be explained in further detail with reference to the following example.

Suppose that the device 22(B) is the predefined home for a particular extent Z. Additionally, suppose that the device 22(C) is the current owner of the extent Z (i.e., the device 22(C) that last accessed the extent Z). Furthermore, suppose that an application 52 (also see FIG. 1) running on the device 22(A) provides an instruction with a shared virtual memory (SVM) address X that requires access to data within the extent Z.

Figure 4:
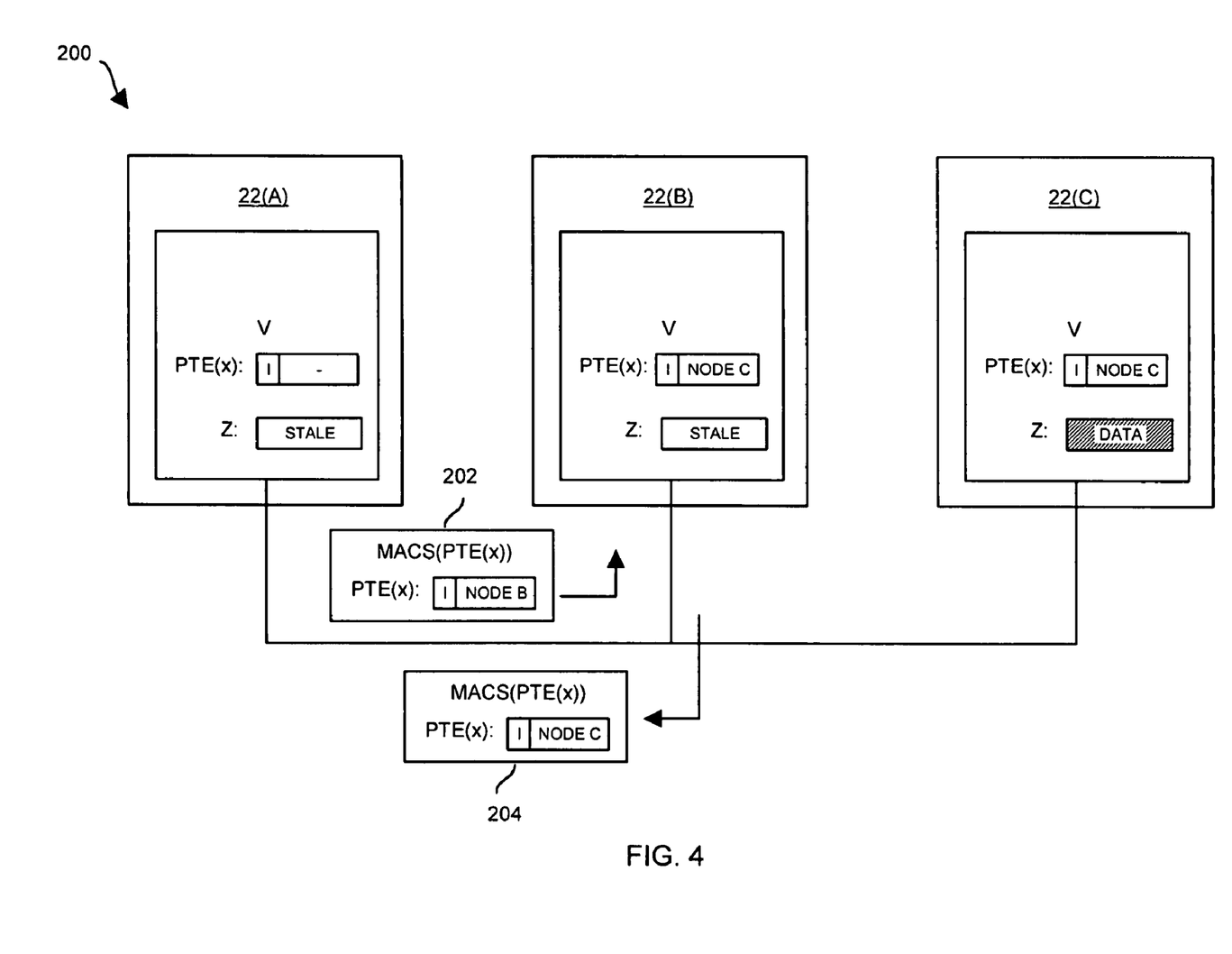
FIG. 4 is a block diagram of the system of FIG. 1 during a first phase of an exemplary shared memory access operation.

The state of the system 20 at this point is shown in FIG. 4. In particular, in the device 22(A), the page table entry PTE(x) to the sparse virtual page Vx is invalid (i.e., the valid bit V is set to "I") and the PTE's contents are nil, (since the device 22(A) is not the current owner of the extent Z) and the contents within the extent Z of the physical memory 28 are stale (since the device 22(A) was not the device 22 to most recently access the extent Z). Similarly, in the device 22(B), the page table entry PTE(x) to the sparse virtual page Vx is also invalid (i.e., device 22(B) is not currently accessing extent Z), and the contents of PTE(x) does not identify this device 22(B), so the contents within the extent Z of the physical memory 28 are also stale (the device 22(B) was not the device 22 to most recently access the extent Z). Nevertheless, since device 22(B) is the predefined home node for the extent Z, a field of the page table entry PTE(x) contains an identifier for device 22(C) which is the current owner of the extent Z. That is, the metadata within PTE(x) on device 22(B) (i.e., the home node for extent Z) identifies the current owner for extent Z.

In connection with device 22(C), the page table entry PTE (x) corresponding to the sparse virtual page Vx is also invalid since the device 22(C) has recently relinquished exclusive access to the extent Z, but the data resides within the extent Z of the physical memory 28. Accordingly, in device 22(C), a field of the page table entry PTE(x) contains an identifier for device 22(C) thus further indicating that device 22(C) is the current owner of the extent Z. Further details of how the system 20 provides access to the data in extent Z to device 22(A) will now be provided.

As shown in FIG. 4, in order for the device 22(A) to find out which device 22 is the current owner of the extent Z and thus which device 22 holds the actual data, the device 22(A) sends an owner request 202 to the home node of the extent Z. Since the home node for the extent Z was predefined prior to operation of the system 20 to be device 22(B) (e.g., algorithmically determined by the page fault handler 46, also see FIG. 1), the device 22(A) knows to send the owner request 202 to the device 22(B). By way of example, the device 22(A) prepares and sends this owner request 202 to the device 22(B) (i.e., the home of the extent Z) through the communications medium 24 as a PTE MACS operation on PTE(x).

As further shown in FIG. 4, the device 22(B) responds to the owner request 202 by performing the MACS operation on the PTE for SVM address X. The masked-compare portion of the MACS operation determines that there is not a match between the data in the MACS request and the PTE, so the swap portion of the MACS operation is not performed. The device 22(B) then returns an owner response 204 having the MACS result (i.e., a copy of its PTE for X) to the device 22(A) through the communications medium 24. Recall that the PTE for X in the device 22(B) includes metadata that identifies the current owner of the extent Z, i.e., device 22(C).

Figure 5:
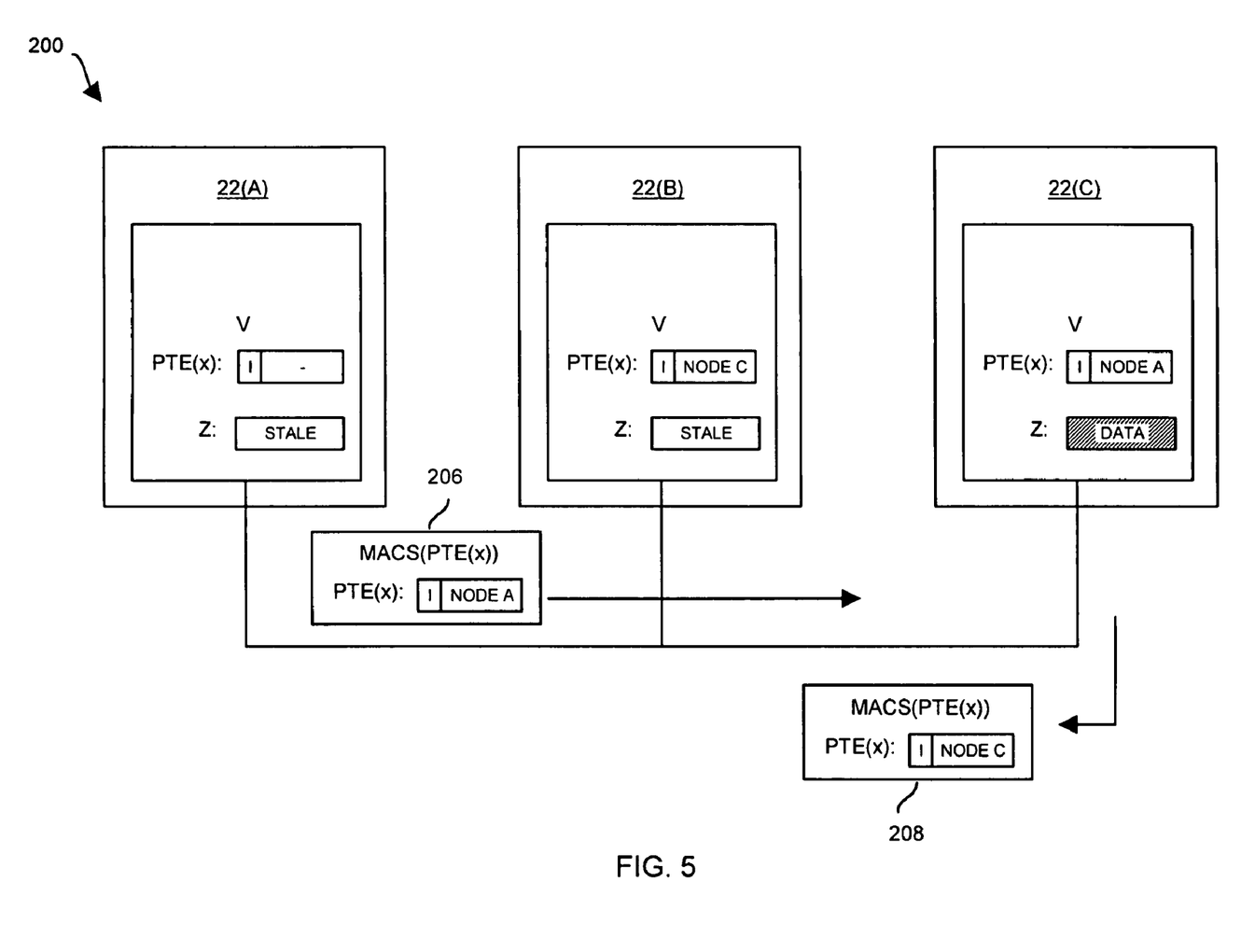
FIG. 5 is a block diagram of the system of FIG. 1 during a second phase of the shared memory access operation.

As shown in FIG. 5, upon receipt of the owner response 204, the device 22(A) checks the MACS result and finds metadata identifying device 22(C) as the current owner of the extent Z. Accordingly, the device 22(A) now expects that the up-to-date data is in extent Z within device 22(C). In response, the device 22(A) generates a data request 206, and sends that data request 206 to the device 22(C) through the communications medium 24. The data request 206 includes metadata identifying device 22(A) as a device 22 wishing to access the extent Z. Again the request 206 takes the form of a PTE MACS operation on PTE(x).

In response to the data request 206 from the device 22(A), the device 22(C) performs the masked-compare portion of the MACS operation. The masked-compare portion of the MACS operation determines that there is a match between the data in the MACS request and the PTE, so the swap portion of the MACS operation is performed. As a result, the PTE for X in the device 22(C) is written with metadata identifying the device 22(A) as the current owner, and the response 208 includes the original PTE for X from the device 22(C) with metadata identifying device 22(C) as the previous owner and that extent Z is not currently in use, as further shown in FIG. 5. Note that in the event the masked-compare portion of the MACS fails because the valid bit (V) in its PTE is currently set, this indicates that the device 22(C) knows that it is currently accessing the extent Z, and thus maintains the PTE for X in its current state (i.e., the metadata would still identify device 22(C)) and sends back a response 208 (e.g., a copy of the PTE for X with the valid bit V set to "V" for valid) indicating that the extent Z is currently in use. Further note that in the event the masked-compare portion of the MACS fails because some other portion of the data in the MACS request mis-compares, this indicates that the device 22(C) no longer is the owner of extent Z, and thus maintains the PTE for X in its current state and sends back a response 208 (e.g., a copy of the PTE for X) indicating that the device 22(C) is no longer the owner of extent Z.

Figure 6:
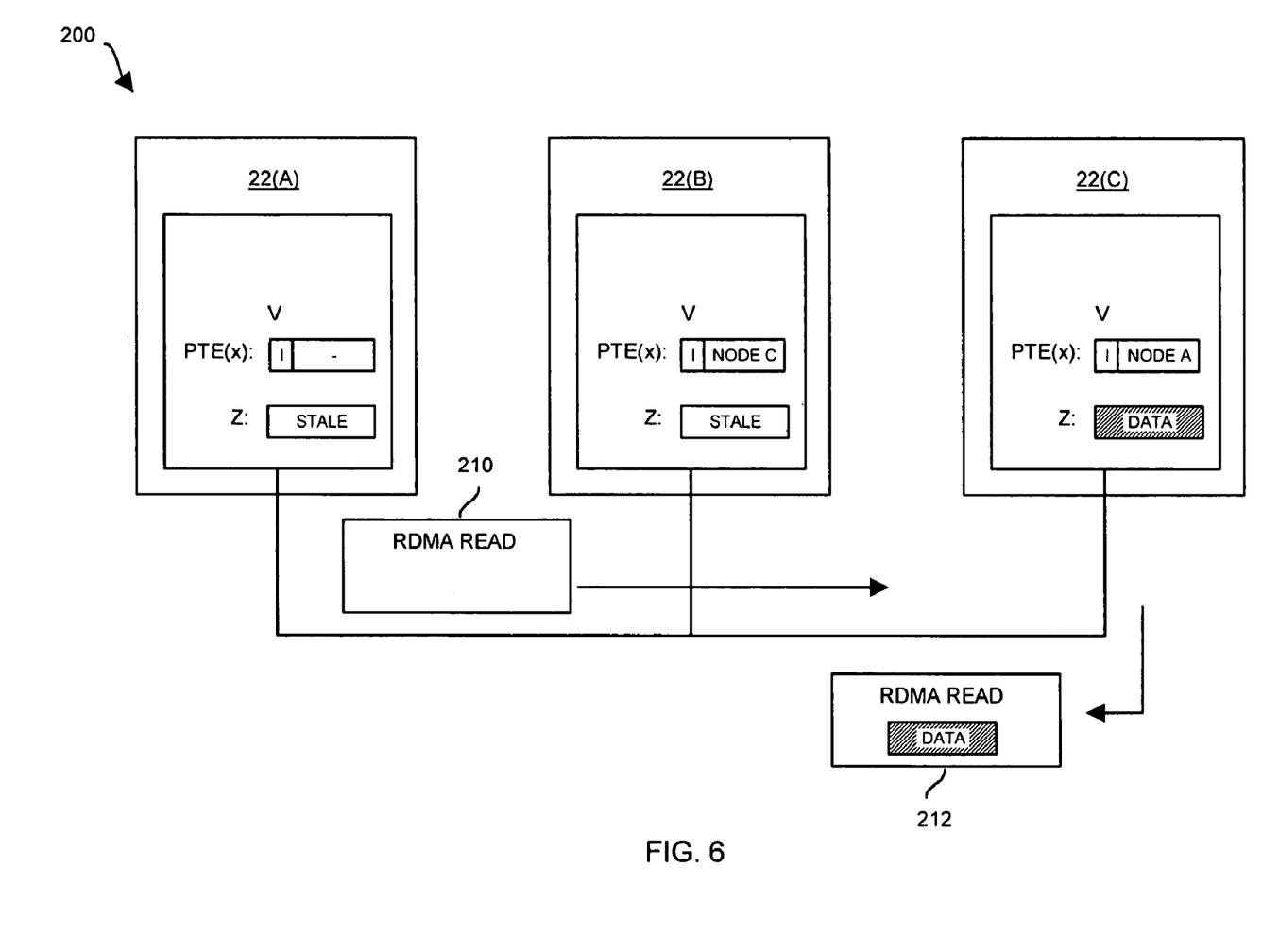
FIG. 6 is a block diagram of the system of FIG. 1 during a third phase of the shared memory access operation.

When the device 22(A) receives a response 208 having the valid bit (V) not set, and metadata identifying device 22(C) as the previous owner, the device 22(A) concludes that the extent Z is available from device 22(C) and that device (C) relinquishes ownership of the extent Z. Accordingly, the device 22(A) generates and sends a data transfer instruction 210 (e.g., an RDMA read instruction) to the device 22(C) through the communications medium 24, as shown in FIG. 6. Upon receipt of the data transfer instruction 210, the device 22(C) provides a reply 212 containing the contents of the extent Z to the device 22(A) through the communications medium 24, as further shown in FIG. 6. The size of the reply 212 needs to be only slightly larger than the extent granularity (e.g., to frame the shared data) thus keeping data transfer latency to a minimum.

Figure 7:
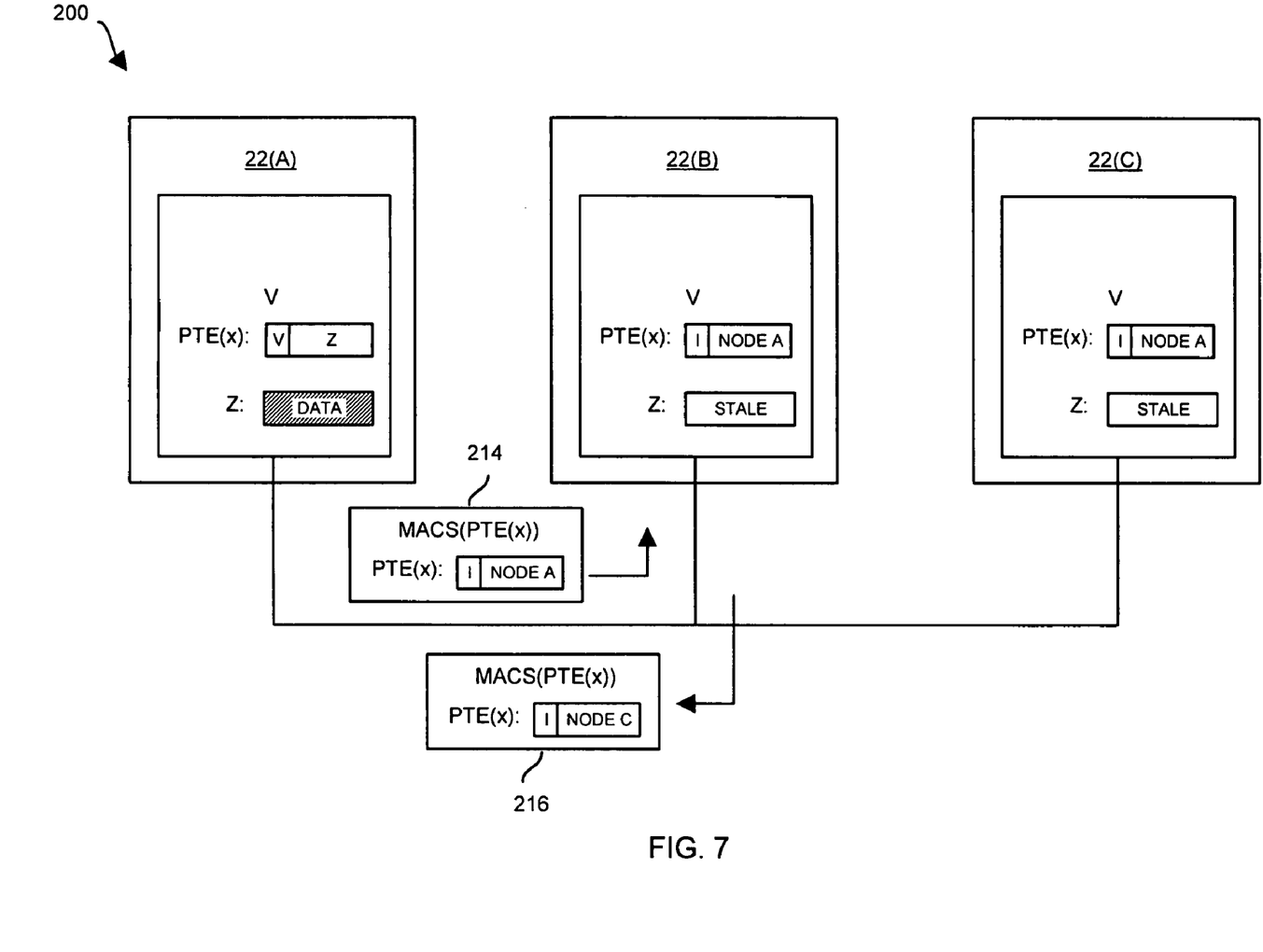
FIG. 7 is a block diagram of the system of FIG. 1 during a fourth phase of the shared memory access operation.

Upon receipt of the reply 212, the device 22(A) places the data into the extent Z in the local physical memory 28, updates its PTE for X by setting the valid bit (V) to indicate that the data in the extent Z is currently in use, and sets the metadata in the PTE for X to point to the extent Z as shown in FIG. 7. The device 22(A) then generates a message 214 with metadata identifying the device 22(A) as the current owner of the data in extent Z, and sends that message 214 to the home node for the extent Z, i.e., the device 22(B) as further shown in FIG. 7. The device 22(B) responds to the message 214 by performing another MACS operation that replaces the older metadata in the PTE for X with new metadata identifying device 22(A) as the new owner of the data in the extent Z and returns a reply 216 to the device 22(A) through the communications medium 24. The reply 216 contains the older metadata identifying the previous owner (i.e., device 22(C)) to allow the device 22(A) to confirm proper operation, as further shown in FIG. 7. At this point, the data is now available to the application 52 running in the device 22(A). Moreover, if another device 22 sends an owner request to the device 22(B) to find the location of the data for extent Z, the PTE for X within the device 22(B) now includes metadata identifying the device 22(A) as having that data and the data in extent Z of the device 22(C) is now stale.

It should be understood that the device 22(A) does not need to push the updated data in extent Z back to where the device 22(A) originally obtained the data (i.e., the device 22(A) does not need to send the revised data back to device 22(C) or the home device 22(B)). Rather, the computerized device 22(A) can enjoy local memory performance on subsequent shared memory accesses to extent Z. If another device 22 requires the data in extent Z, the other device 22 performs a sequence of exchanges similar to that described above and in connection with FIGS. 4-7.

It should be further understood that, after device 22(A) resets the valid bit (V) on the PTE for X to indicate extent Z is available to other devices 22, as long as the device 22(A) remains the device 22 that most recently owned the data in extent Z, the data in extent Z is not stale with the device 22(A) and thus can be re-accessed without any further communications with any of the other devices 22. In particular, upon a request for the data in extent Z by the application 52 running on the device 22(A), the standard VM mechanisms will discover the reset valid bit in the PTE and generate a page fault exception. The page fault handler 46 of the device 22(A) can examine the PTE for X and discover that since the metadata within the PTE identifies the device 22(A), the device 22(A) knows that it is the device 22 that most recently owned the extent Z and thus that the data within the extent Z is not stale. Accordingly, the device 22(A) can set the valid bit in the PTE for X and quickly access the contents of the extent Z, i.e., a quick re-hit.

Moreover, it should be further understood that there is only contention for the data in extent Z if another device 22 truly wants access to the data in extent Z. If another device 22 wants access to a different extent (e.g., another extent which closely neighbors extent Z within the same physical page P of the physical memory 28), the other device 22 nevertheless addresses a different virtual page Vy which corresponds to a different PTE due to the above-described sparse virtual paging scheme. As a result, the access attempt by the other device 22 will not necessarily interfere with the handling of extent Z by the device 22(A). That is, contention for data within each extent is minimized even though multiple extents reside within the same physical page P in physical memory 28. Further details will now be provided with reference to FIG. 8.

Figure 8:
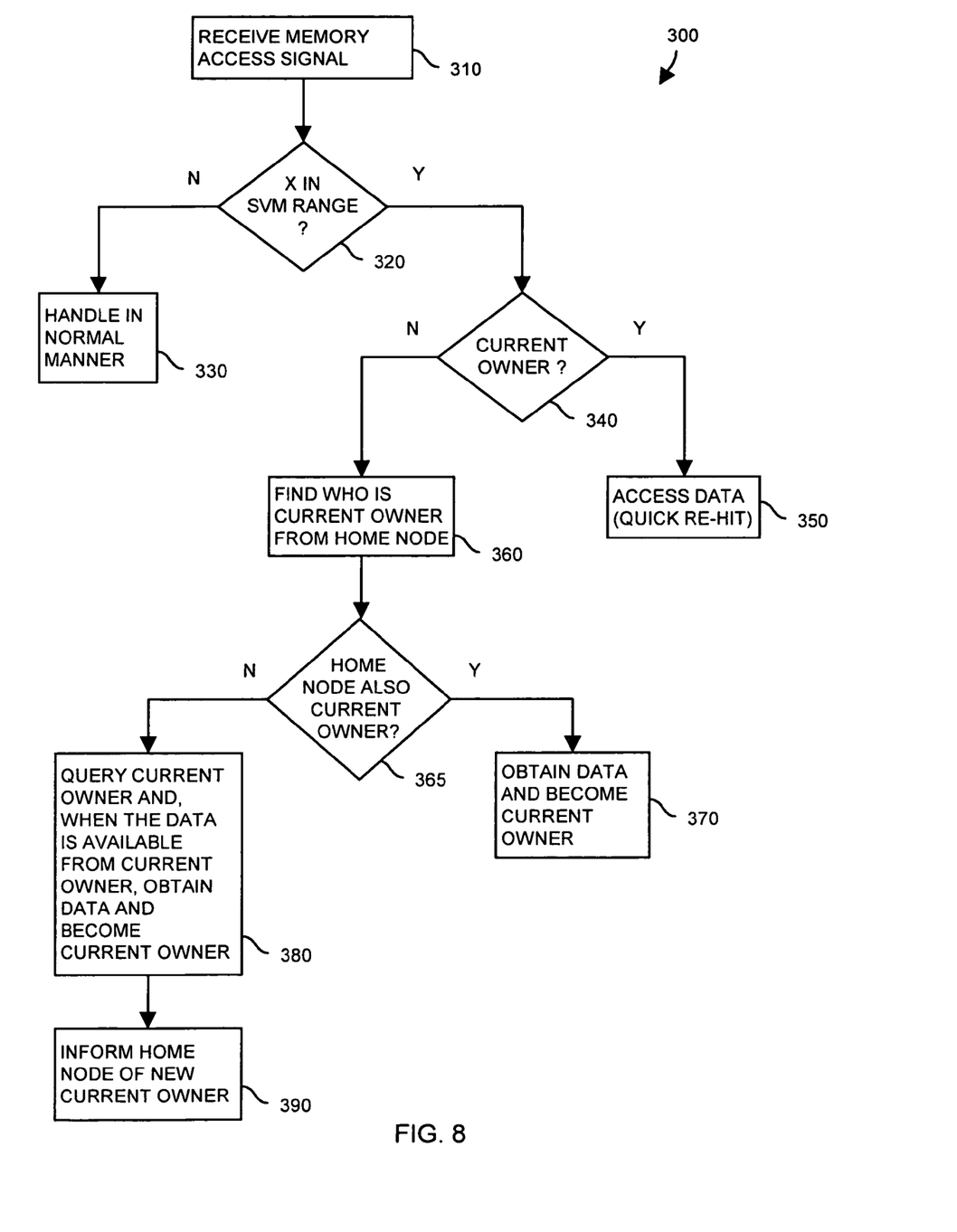
FIG. 8 is a flowchart of a procedure which is performed by a page fault handler of the system of FIG. 1.

FIG. 8 is a flowchart of a procedure 300 which is performed by the page fault handler 46 of each computerized device 22 of the system 20 along the lines described above when providing access to data. In step 310, the page fault handler 46 receives a memory access signal. In the context of FIGS. 4-7 above, the page fault handler 46 activates upon execution of an instruction referencing SVM address X (e.g., access(x)) where virtual page Vx is the virtual page to be accessed and the PTE for X is invalid. The page fault handler 46 then proceeds to step 320.

In step 320, the page fault handler 46 checks to see if virtual page Vx is within the ordinary address range 54 or the shared virtual memory range 56. That is, the handler 46 determines which type of page fault has occurred based on a comparison between the SVM address X and the local and shared virtual memory ranges 54, 56. If SVM address X is in the ordinary address range 54, the page fault handler 46 proceeds to step 330. Otherwise, if SVM address X is in the shared virtual memory range 56, the page fault handler 46 proceeds to step 340.

In step 330, the page fault handler 46 attends to the fault operation in a normal manner. In particular, the page fault handler 46 operates in a traditional page miss manner and thus provides reliable access to the data.

In step 340, when the SVM address X is in the shared virtual memory range 56, the page fault handler 46 knows that the SVM address X refers to a particular extent 102 within the shared memory range 34 of physical memory 28 (e.g., see extent Z in the earlier example of FIGS. 4-7). At this point, the page fault handler 46 determines whether the device 22 on which the handler 46 is running is the current owner of the particular extent 102 referenced by SVM address X. During this step, the page fault handler 46 inspects the metadata of the PTE(x). For example, if the handler 46 is running on device 22(A) and the metadata of PTE(x) indicates that the device 22(A) is the current owner (see FIG. 7), the device 22(A) knows that the data for extent Z is already in the local physical memory 28 of device 22(A). In this situation, when the data for the extent 102 is local, the page fault handler 46 proceeds to step 350. However, if the handler 46 is running on device 22(A) (see FIG. 4) and the metadata of PTE(x) does not indicate that the device 22(A) is the current owner, the device 22(A) knows that it must obtain the data for extent 102 from another device 22. In this situation, when the data for the particular extent 102 is remote, the page fault handler 46 proceeds to step 360.

In step 350, the page fault handler 46 has determined that the data for the particular extent 102 resides in the local physical memory 28. Accordingly, the page fault handler 46 sets the PTE for X as currently in use (i.e. sets its valid bit) and provides access to the data in physical memory 28. The latency for such access is relatively low (e.g., on the order of microseconds) since a "hit" has occurred on physical memory 28. Moreover, as long as the current computerized device 22 is the most recent device 22 to access the particular extent 102, the current computerized device 22 can continue to enjoy quick "re-hits" by simply re-accessing the extent 102 locally.

In step 360, the page fault handler 46 has determined that the data for the particular extent 102 resides in remote physical memory 28 on another device 22, and determines which device 22 is the current owner of the particular extent 102. Recall that all of the devices 22 are pre-configured to know all of the home nodes for all of the extents 102. Accordingly, if this device 22 discovers that itself is the home node for this extent 102 corresponding to SVM address X, then it can examine its own PTE(x) to determine which device 22 is the current owner. Otherwise, the page fault handler 46 sends an owner request 202 to the home node for the particular extent 102 corresponding to SVM address X (e.g., see the request message 202 sent from the device 22(A) to the device 22(B) for the extent Z in FIG. 4). In response to the owner request 202, the home node provides an owner response 204 which identifies the current owner of the particular extent 102 (e.g., see the owner response 204 sent from the device 22(B) back to the device 22(A) in FIG. 4).

In step 365, upon receipt of the owner response 204, the page fault handler 46 learns if the home node is the current owner or not. If it is, and the home node's response indicates it is not using the extent 102 (i.e., if the valid bit in the data response 204 is not set), then the page fault handler 46 knows that the home node has transferred ownership to it. Accordingly, the page fault handler 46 proceeds to step 370 where it retrieves the data in the particular extent 102 (e.g., using built-in RDMA provided by InfiniBand) from the home node and updates the PTE 44 in its own page table 42 to indicate that it is now the new current owner. Additionally, the home node automatically updates its PTE to indicate that the device 22 on which the page fault handler 46 is running is the new current owner.

Otherwise, the home node is not the current owner, but its response has indicated which device 22 is. The page fault handler 46 now knows the current owner of the particular extent 102, and proceeds to step 380.

In step 380, the page fault handler 46 sends a data request 206 to the device 22 which is identified as the current owner of the particular extent 102 (e.g., see the device 22(C) in FIG. 5). That device 22 will provide a data response 208 indicating whether it is still using the extent 102 (i.e., if the valid bit in the data response 208 is still set) and if it was the previous owner. If the identified device 22 indicates that the data is available (i.e., the valid bit in the data response 208 is not set) and it was the previous owner, then the page fault handler 46 knows its device is now the current owner and retrieves the data in the particular extent 102 (e.g., using built-in RDMA provided by InfiniBand) and updates the PTE 44 in its page table 42 to indicate that it is now the new current owner and that the PTE is currently in use (e.g., also see FIGS. 6-7). The page fault handler 46 then proceeds to step 390.

In step 390, the page fault handler 46 informs the home node for the particular extent 102 that it is the new current owner. For example, the device 22(A) exchanges messages 214, 216 with the device 22(B) to inform the device 22(B) that the device 22(A) is the new current owner of extent Z in FIG. 7. At this point, the page fault handler 46 provides access to the data in the particular extent 102. Furthermore, as long as the current computerized device 22 is the most recent device 22 to access the particular extent 102, the current computerized device 22 can continue to enjoy quick "re-hits" by simply re-accessing the extent 102 locally.

It should be understood that the above-described sub-page-granular cache coherency technique is well-suited for use with an implicit locking mechanism. Such a mechanism is described in U.S. patent application Ser. No. 11/393,063, entitled "IMPLICIT LOCKS IN A SHARED VIRTUAL MEMORY SYSTEM" which has the same Assignee as the current Application and which was filed on Mar. 29, 2006, the teachings of which are hereby incorporated by reference in their entirety.

It should be further understood that the above-described sub-page-granular cache coherency technique is well-suited for use in the context of a shared virtual memory system which is configured to mirror data based on page table entries. Such a system is described in U.S. patent application Ser. No. 11/393,438, entitled "TECHNIQUES FOR MIRRORING DATA WITHIN A SHARED VIRTUAL MEMORY SYSTEM" which has the same Assignee as the current Application and which was filed on Mar. 29, 2006, the teachings of which are hereby incorporated by reference in their entirety.

As mentioned above, an improved technique involves providing access to shared data based on an enhanced shared virtual memory mechanism. In particular, once data from a shared area of memory is moved into primary memory 28 of a first computerized device 22 from a second computerized device 22 (e.g., in a manner similar to faulting a page into primary memory 28 from magnetic disk memory 50), the first computerized device 22 can retain that data in order to shorten the latency of subsequent accesses (i.e., to experience quick re-hits). Along these lines, such a technique can be configured to handle shared data at the sub-page-granular level using sparse virtual pages to minimize memory access contention and thus improve the likelihood of quick re-hits. Furthermore, such a technique can be conveniently accomplished through an enhancement to a common page fault handler 46 of an operating system and a standard communications protocol (e.g., InfiniBand, Rapid IO, etc.) thus alleviating the need to employ more costly and complicated solutions such as inflexible hardware implementations or independent programs that could pose additional design burdens and reliability concerns.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that InfiniBand and Rapid IO were described above as suitable protocols for handling communications between the devices 22 through the communications medium 24 because they offer off-the-shelf atomic access to the shared memory spaces on remote devices 22. Nevertheless, other protocols, hardware, software or a combination of both, that provide similar atomic masked compare and swap and RDMA features are suitable for use by the system 20 as well. Preferably, the external interfaces 30 (e.g., HCAs) of the devices 22 handle the atomic masked compare-and-swap and RDMA operations so that there is no operating system involvement required on the remote devices 22.

What is claimed is:

1. In a computerized device having (i) local physical memory and (ii) a page table which maps a local virtual memory range and a shared virtual memory range to the local physical memory, a method for accessing data, the method comprising:

receiving a request for data and determining whether a page hit or a page fault has occurred based on an examination of virtual memory metadata;

in response to a determined page hit where the data resides in the physical memory, providing access to the data residing in the physical memory;

in response to a determined page fault where the data resides in the physical memory, providing access to the data residing in the physical memory; and in response to a determined page fault where the data does not reside in the physical memory, moving the data (i) from secondary memory into the physical memory when the virtual address of the request falls within the local virtual memory range and (ii) from another computerized device into the physical memory when the virtual address of the request falls within the shared virtual memory range;

wherein moving the data includes transferring the data from the other computerized device into a shared portion of the physical memory, and updating the page table to indicate that the data now resides in the shared portion of the physical memory;

wherein the method further comprises:

receiving another request for the data and determining whether a page hit or a page fault has occurred based on an examination of virtual memory metadata associated with the virtual address of the other request, and in response to a determined page hit where the data now resides in the shared portion of the physical memory, providing access to the data now residing in the shared portion of the physical memory;

wherein the shared portion of the physical memory is a set of physical memory pages contiguously divided into equal-sized extents;

wherein providing access to the data residing in the physical memory includes:

when the virtual address of the request falls within the local virtual memory range, mapping the virtual address of the request to a page of the physical memory and enabling the data to be accessed from the page, and when the virtual address of the request falls within the shared virtual memory range, mapping the virtual address to an extent of the shared portion of the physical memory and enabling the data to be accessed from the extent;

wherein the secondary memory is magnetic disk drive memory; and wherein moving the data in response to the determined page fault includes:

when the virtual address of the request falls within the local virtual memory range, transferring the data from the magnetic disk drive memory into the page of the physical memory and permitting access to the data from the page, and when the virtual address of the request falls within the shared virtual memory range, transferring the data from the other computerized device into the extent of the shared portion of the physical memory and permitting access the data to be accessed from the extent; and wherein there are N computerized devices forming a distributed computer system; wherein a shared physical memory range is divided into M extents; wherein each of the N computerized devices is configured to be the home of a respective subset of the M extents in a predefined manner; and wherein transferring the data from the other computerized device into the extent of the shared portion of the physical memory includes:

performing a set of masked atomic compare and swap operations to acquire, as the data, information which is shared among each of the N computerized devices forming the distributed computer system.

2. A method as in claim 1 wherein a first computerized device is the home of an extent, the first computerized device being responsible for tracking ownership of an extent; wherein a second computerized device initially holds the information; and wherein performing the set of masked atomic compare and swap operations includes:

directing the first computerized device to perform a masked atomic compare and swap operation on the first computerized device to a page table entry associated with a shared virtual address which corresponds to the extent to obtain the identity of the second computerized device among the N computerized devices, directing the second computerized device to perform a masked atomic compare and swap operation on the second computerized device to a page table entry associated with a shared virtual address which corresponds to the extent to establish the third computerized device as the new owner, performing a remote direct memory access operation to obtain the information from the second computerized device, directing the third computerized device to perform a masked atomic compare and swap operation on the third computerized device to a page table entry associated with a shared virtual address which corresponds to the extent to establish the third computerized device as the new owner, and directing the first computerized device to perform a masked atomic compare and swap operation on the first computerized device to a page table entry associated with a shared virtual address which corresponds to the extent to establish the third computerized device as the new owner.

3. A method as in claim 1 wherein a first computerized device is the home of an extent and also initially holds the information; and wherein performing the set of masked atomic compare and swap operations includes:

directing the first computerized device to perform a masked atomic compare and swap operation on the first computerized device to a page table entry associated with a shared virtual address which corresponds to the extent establishing the second computerized device as the new owner, performing a remote direct memory access operation to obtain the information from the first computerized device, and directing the second computerized device to perform a masked atomic compare and swap operation on the second computerized device to a page table entry associated with a shared virtual address which corresponds to the extent to establish the second computerized device as the new owner.

4. A method as in claim 1 wherein a first computerized device is the home of an extent; wherein a second computerized device initially holds the information; and wherein performing the set of masked atomic compare and swap operations includes:

directing the first computerized device to perform a masked atomic compare and swap operation on the first computerized device to a page table entry associated with a shared virtual address which corresponds to obtain the identity of the second computerized device among the N computerized devices, directing the second computerized device to perform a masked atomic compare and swap operation on the second computerized device to a page table entry associated with a shared virtual address which corresponds to the extent to establish the first computerized device as the new owner, performing a remote direct memory access operation to obtain the information from the second computerized device, and directing the first computerized device to perform a masked atomic compare and swap operation on the first computerized device to a page table entry associated with a shared virtual address which corresponds to the extent to establish the first computerized device as the new owner.

5. A method as in claim 1 wherein each extent is less than a page in size and has an extent size which is a multiple of a cache line size of the computerized device.

6. A method as in claim 1 wherein each extent is mapped from a unique virtual page in the shared virtual memory range resulting in a sparse shared virtual address range corresponding to the shared physical memory range divided into the M extents.

7. A method as in claim 1 wherein physical memory of each of the N computerized devices includes a same shared physical memory range corresponding to the shared virtual memory space within the distributed computer system.

8. A method as in claim 1, further comprising:
performing a masked atomic compare and swap operation to confirm ownership of a particular extent.

9. A method as in claim 1 wherein the shared physical memory range is contiguous; and wherein the method further comprises:
dividing the shared physical memory range into the M extents.

10. A method as in claim 1 wherein the distributed computer system formed by the N computerized devices effectively operates as an N-way mirror.

11. A computerized device, comprising:
local physical memory;
an internodal communications interface; and
a controller coupled to the physical memory and the internodal communications interface, the controller having virtual memory related components including (i) a translation lookaside buffer, (ii) a page table which maps a local virtual memory range and a shared virtual memory range to the physical memory, and (iii) a page fault handler, the page fault handler being configured to:
  receive a request for data and determining whether a page hit or a page fault has occurred based on an examination of virtual memory metadata,
  in response to a determined page hit where the data resides in the physical memory, provide access to the data residing in the physical memory,
  in response to a determined page fault where the data resides in the physical memory, provide access to the data residing in the physical memory, and
  in response to a determined page fault where the data does not reside in the physical memory, move the data (i) from secondary memory into the physical memory when the virtual address of the request falls within the local virtual memory range and (ii) from another computerized device through the internodal communications interface into the physical memory when the virtual address of the request falls within the shared virtual memory range;
wherein the page fault handler, when moving the data, is configured to transfer the data from the other computerized device into a shared portion of the physical memory, and update the page table to indicate that the data now resides in the shared portion of the physical memory;
wherein the page fault handler is further configured to:
  receive another request for the data and determining whether a page hit or a page fault has occurred based on an examination of virtual memory metadata associated with the virtual address of the other request; and
  in response to a determined page hit where the data now resides in the shared portion of the physical memory, provide access to the data now residing in the shared portion of the physical memory;
wherein the shared portion of the physical memory is a set of physical memory pages contiguously divided into equal-sized extents;
wherein the page fault handler, when providing access to the data residing in the physical memory, is configured to:
  when the virtual address of the request falls within the local virtual memory range, map the virtual address of the request to a page of the physical memory and enable the data to be accessed from the page, and
  when the virtual address of the request falls within the shared virtual memory range, map the virtual address to an extent of the shared portion of the physical memory and enable the data to be accessed from the extent;
wherein the secondary memory is magnetic disk drive memory; and wherein the page fault handler, when moving the data in response to the determined page fault, is configured to:
  when the virtual address of the request falls within the local virtual memory range, transfer the data from the magnetic disk drive memory into the page of the physical memory and permit access to the data from the page, and
  when the virtual address of the request falls within the shared virtual memory range, transfer the data from the other computerized device into the extent of the shared portion of the physical memory and permit access the data to be accessed from the extent; and
wherein there are N computerized devices forming a distributed computer system; wherein a shared physical memory range is divided into M extents; wherein each of the N computerized devices is configured to be the home of a respective subset of the M extents in a predefined manner; and wherein the page fault handler, when transferring the data from the other computerized device into the extent of the shared portion of the physical memory, is configured to:
perform a set of masked atomic compare and swap operations to acquire, as the data, information which is shared among each of the N computerized devices forming the distributed computer system.

12. A computerized device as in claim 11 wherein a first computerized device is the home of an extent; wherein a second computerized device initially holds the information; and wherein the page fault handler, when performing the set of masked atomic compare and swap operations, is configured to:
  direct the first computerized device to perform a masked atomic compare and swap operation on the first computerized device to a page table entry associated with a shared virtual address which corresponds to the extent to obtain the identity of the second computerized device among the N computerized devices,
  direct the second computerized device to perform a masked atomic compare and swap operation on the second computerized device to a page table entry associated with a shared virtual address which corresponds to the extent to establish the third computerized device as the new owner,
  perform a remote direct memory access operation to obtain the information from the second computerized device,
  direct the third computerized device to perform a masked atomic compare and swap operation on the third computerized device to a page table entry associated with a shared virtual address which corresponds to the extent to establish the third computerized device as the new owner, and
  direct the first computerized device to perform a masked atomic compare and swap operation on the first computerized device to a page table entry associated with a shared virtual address which corresponds to the extent to establish the third computerized device as the new owner.

13. A computerized device as in claim 11 wherein a first computerized device is the home of an extent and also initially holds the information; and wherein the page fault handler, when performing the set of masked atomic compare and swap operations from a second computerized device, is configured to:
- direct the first computerized device to perform a masked atomic compare and swap operation on the first computerized device to a page table entry associated with a shared virtual address which corresponds to the extent establishing the second computerized device as the new owner,
- perform a remote direct memory access operation to obtain the information from the first computerized device, and
- direct the second computerized device to perform a masked atomic compare and swap operation on the second computerized device to a page table entry associated with a shared virtual address which corresponds to the extent to establish the second computerized device as the new owner.

14. A computerized device as in claim 11 wherein a first computerized device is the home of an extent; wherein a second computerized device initially holds the information; and wherein the page fault handler, when performing the set of masked atomic compare and swap operations, is configured to:
- direct the first computerized device to perform a masked atomic compare and swap operation on the first computerized device to a page table entry associated with a shared virtual address which corresponds to obtain the identity of the second computerized device among the N computerized devices,
- direct the second computerized device to perform a masked atomic compare and swap operation on the second computerized device to a page table entry associated with a shared virtual address which corresponds to the extent to establish the first computerized device as the new owner,
- perform a remote direct memory access operation to obtain the information from the second computerized device, and
- direct the first computerized device to perform a masked atomic compare and swap operation on the first computerized device to a page table entry associated with a shared virtual address which corresponds to the extent to establish the first computerized device as the new owner.

15. A computerized device as in claim 11 wherein each extent is less than a page in size and has an extent size which is a multiple of a cache line size of the computerized device.

16. A computerized device as in claim 11 wherein each extent is mapped from a unique virtual page in the shared virtual memory range resulting in a sparse shared virtual address range corresponding to the shared physical memory range divided into the M extents.

17. A computerized device as in claim 11 wherein physical memory of each of the N computerized devices includes a same shared physical memory range corresponding to the shared virtual memory space within the distributed computer system.

18. A computerized device as in claim 11 wherein the controller is further configured to:
- perform a masked atomic compare and swap operation to confirm ownership of a particular extent.

19. A computerized device as in claim 11 wherein the shared physical memory range is contiguous; and wherein the controller is further configured to:
- divide the shared physical memory range into the M extents.

20. A computerized device as in claim 11 wherein the distributed computer system formed by the N computerized devices is configured to effectively operate as an N-way mirror.

21. A shared memory system, comprising:
multiple computerized devices; and
a communications medium connecting the computerized devices to each other; each computerized device having local physical memory, an internodal communications interface, and a controller coupled to the physical memory and the internodal communications interface, the controller having virtual memory related components including (i) a translation lookaside buffer, (ii) a page table which maps a local virtual memory range and a shared virtual memory range to the physical memory, and (iii) a page fault handler, the page fault handler being configured to:
- receive a request for data and determining whether a page hit or a page fault has occurred based on an examination of virtual memory metadata;
- in response to a determined page hit where the data resides in the physical memory, provide access to the data residing in the physical memory;
- in response to a determined page fault where the data resides in the physical memory, provide access to the data residing in the physical memory; and
- in response to a determined page fault where the data does not reside in the physical memory, move the data (i) from secondary memory into the physical memory when the virtual address of the request falls within the local virtual memory range and (ii) from another computerized device through the internodal communications interface and the communications medium into the physical memory when the virtual address of the request falls within the shared virtual memory range; wherein moving the data from the other computerized device into the physical memory involves performing a set of masked atomic compare and swap operations to acquire, as the data, information which is distributed among the multiple computerized devices.

22. A shared memory system as in claim 21 wherein each computerized device is configured to:
perform a masked atomic compare and swap operation to confirm ownership of a particular extent.

23. A shared memory system as in claim 21 wherein the shared physical memory range is contiguous; and wherein each computerized device is configured to:
divide the shared physical memory range into the M extents.

24. A shared memory system as in claim 21 wherein the multiple computerized devices are configured to effectively operate as an N-way mirror.

* * * * *